(12) United States Patent
Petersson et al.

(10) Patent No.: US 8,981,993 B2
(45) Date of Patent: Mar. 17, 2015

(54) BEAMFORMING METHODS AND APPARATUSES

(75) Inventors: Sven Petersson, Savedalen (SE); Björn Johannisson, Kungsbacka (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 994 days.

(21) Appl. No.: 13/095,426

(22) Filed: Apr. 27, 2011

(65) Prior Publication Data

US 2012/0274514 A1 Nov. 1, 2012

(51) Int. Cl.
| | |
|---|---|
| H01Q 3/00 | (2006.01) |
| H04B 7/04 | (2006.01) |
| H01Q 3/26 | (2006.01) |
| H01Q 25/00 | (2006.01) |
| H04B 7/06 | (2006.01) |
| H04B 7/08 | (2006.01) |
| H04B 7/10 | (2006.01) |

(52) U.S. Cl.
CPC ............... *H04B 7/0408* (2013.01); *H01Q 3/26* (2013.01); *H01Q 25/001* (2013.01); *H04B 7/0617* (2013.01); *H04B 7/0842* (2013.01); *H04B 7/10* (2013.01)
USPC ......................................................... 342/368

(58) Field of Classification Search
USPC .......................................... 342/368, 373, 374
See application file for complete search history.

(56) References Cited

U.S. PATENT DOCUMENTS

| | | | |
|---|---|---|---|
| 5,649,287 A | 7/1997 | Forssen et al. | |
| 6,107,963 A | 8/2000 | Ohmi et al. | |
| 7,129,888 B1 * | 10/2006 | Chesley | 342/159 |
| 7,151,951 B2 | 12/2006 | Goransson et al. | |
| 2004/0077379 A1 | 4/2004 | Smith et al. | |
| 2004/0198292 A1 | 10/2004 | Smith et al. | |
| 2007/0243831 A1 | 10/2007 | Seki | |
| 2009/0160707 A1 | 6/2009 | Lakkis | |

FOREIGN PATENT DOCUMENTS

| | | | |
|---|---|---|---|
| JP | 2006180339 A | * | 7/2006 |
| WO | 0186023 A2 | | 11/2001 |
| WO | 2004004156 A1 | | 1/2004 |
| WO | 2010006645 A1 | | 1/2010 |
| WO | 2011050866 A1 | | 5/2011 |

OTHER PUBLICATIONS

International Search Report and Written Opinion for PCT/EP2012/052414, mailed May 16, 2012, 11 pages.

* cited by examiner

*Primary Examiner* — Harry Liu
(74) *Attorney, Agent, or Firm* — Rothwell, Figg, Ernst & Manbeck, P.C.

(57) ABSTRACT

A method is provided for using an antenna array to create two beams (a first beam and a second beam). In one aspect, the method uses dual polarization beam forming, which allows for many degrees of freedom in designing a desired power pattern. The method is well suited for systems with multiple radio chains (e.g., systems with active antennas). The method is also well suited for multi-port systems such as TD-SCDMA. In some embodiments, the method produces two beams where
(a) the shape of the power beam pattern for the first beam and the shape of the power beam pattern for the second beam are the same (or substantially the same) in a plurality of directions of interest and (b) the beams have orthogonal (or substantially orthogonal) polarizations in the coverage area.

22 Claims, 11 Drawing Sheets

BEAMFORMING METHODS AND APPARATUSES

TECHNICAL FIELD

The invention relates to the field of beam forming.

BACKGROUND

Methods exist for using an antenna array to attempt to create beams having a desired beam shape. In many cases, however, the match between the actual beam shape and the desired beam shape is poor. In addition, the power utilization achieved is often poor.

What is desired, therefore, are improved apparatuses and methods for using an antenna array to create beams.

SUMMARY

Antenna arrays for producing at least two beams (a first beam and a second beam) and methods for using the antenna arrays are provided. In one aspect, a method for using an antenna array employs dual polarization beam forming, which allows for many degrees of freedom in designing a desired power pattern. The provided methods are well suited for systems with multiple radio chains (e.g., systems with active antennas). The methods are also well suited for multi-port systems such as TD-SCDMA. In some embodiments, two beams are produced where each beam has (a) substantially the same power pattern as the other beam in a plurality of directions of interest (or "user equipment (UE) coverage area"), as opposed to in only a single direction of interest, such as the direction of a specific UE location, and (b) a substantially orthogonal polarization with respect to the other beam in the UE coverage area. Some advantages gained from implementing a method according to some embodiments of the invention include: (1) better possibility to realize beams with patterns that match desired beam shapes; (2) better power utilization; and (3) less sensitivity to amplitude and phase errors.

In some embodiments, an antenna array apparatus is provided, where the antenna array apparatus includes a first antenna element (AE1-$a$) and a second antenna element (AE1-$b$). The first antenna element includes a first antenna (A1) and an antenna element port ($S_{1a}$) connected to the first antenna. The second antenna element includes a second antenna (A2) and an antenna element port ($T_{1b}$) connected to the second antenna. The antenna array apparatus also includes a first beam forming circuit for applying beam weights $W_{b1,S1a}$ and $W_{b2,S1a}$ to port $S_{1a}$ and a second beam forming circuit for applying beam weights $W_{b1,T1b}$ and $W_{b2,T1b}$ to port $T_{1b}$.

In some embodiments, $W_{b2,S1a}$ is a function of $W_{b1,T1b}$ and $W_{b2,T1b}$ is a function of $W_{b1,S1a}$. For example, $W_{b2,S1a}$ may be a function of the complex conjugate of $W_{b1,T1b}$ and $W_{b2,T1b}$ is a function of the complex conjugate of $W_{b1,S1a}$. In some embodiments, $W_{b2,S1a}$ is determined by phase shifting and amplitude scaling the complex conjugate of $W_{b1,T1b}$. In some embodiments, the phase shift creates a sign shift. In some embodiments, the complex conjugate of $W_{b1,T1b}$ is shifted by ($\beta$+pi). For instance, in some embodiments, $W_{b2,S1a}$ equals or substantially equals $e^{i(\beta+\pi)}(W_{b1,T1b})^{*}\alpha_1$. In some embodiments, $\alpha_1$ is a function the power of a signal emitted by the first antenna and the power of a signal emitted by the second antenna. In some embodiments, $\alpha_1=1$.

In some embodiments, $W_{b2,T1b}$ is determined by multiplying the complex conjugate of $W_{b1,S1a}$ by the inverse of the amplitude scaling factor. In some embodiments, $W_{b2,T1b}$ is determined by phase shifting the complex conjugate of $W_{b1,S1a}$ by $\beta$. For instance, in some embodiments, $W_{b2,T1b}$ equals or substantially equals $e^{i\beta}(W_{b1,S1a})^{*}1/\alpha_1$.

In some embodiments, the first antenna (A1) has a first polarization, the second antenna (A2) has a second polarization, and the first polarization is orthogonal (or substantially orthogonal) to the second polarization. In some embodiments, the first antenna (A1) and the second antenna (A2) have the same (or substantially the same) power pattern.

In some embodiments, the first antenna element (AE1-$a$) further comprises a second antenna element port ($T_{1a}$) connected to a third antenna (A3) having a polarization and a power pattern and the second antenna element (AE1-$b$) comprises a second antenna element port ($S_{1b}$) connected to a fourth antenna (A4) having a polarization and a power pattern.

In some embodiments, the antenna array apparatus further includes a third beam forming circuit for applying beam weights $W_{b1,S1b}$ and $W_{b2,S1b}$ to port $S_{1b}$ and a fourth beam forming circuit for applying beam weights $W_{b1,T1a}$ and $W_{b2,T1a}$ to port $T_{1a}$.

In some embodiments, $W_{b2,S1b}$ is a function of $W_{b1,T1a}$ and $W_{b1,T1a}$ is a function of $W_{b1,S1b}$. For example, $W_{b2,S1b}$ may be a function of the complex conjugate of $W_{b1,T1a}$ and $W_{b2,T1a}$ is a function of the complex conjugate of $W_{b1,S1b}$. In some embodiments, $W_{b2,S1b}$ is determined by phase shifting and amplitude scaling the complex conjugate of $W_{b1,T1a}$. In some embodiments, the phase shift creates a sign shift. In some embodiments, the complex conjugate of $W_{b1,T1a}$ is shifted by pi ($\pi$). For instance, in some embodiments, $W_{b2,S1b}$ equals or substantially equals $e^{i(\beta+\pi)}(W_{b1,T1a})^{*}\alpha_2$. In some embodiments, $\alpha_2$ is a function the power of a signal emitted by the third antenna and the power of a signal emitted by the fourth antenna. In some embodiments, $\alpha_2=1$.

In some embodiments, the polarization of the first antenna (A1) is orthogonal (or substantially orthogonal) to the polarization of the third antenna (A3), the polarization of the fourth antenna (A4) is orthogonal (or substantially orthogonal) to the polarization of the second antenna (A2), and the third antenna (A3) and the fourth antenna (A4) have the same (or substantially the same) power pattern.

In some embodiments, the antenna array apparatus further includes a third antenna element (AE2-$a$) and a fourth antenna element (AE2-$b$) that together form a second pair of antenna elements (AE2-$a$,AE2-$b$), wherein the third antenna element (AE2-$a$) comprises an antenna element port ($S_{2a}$) connected to a fifth antenna (A5) and the fourth antenna element (AE2-$b$) comprises an antenna element port ($T_{2b}$) connected to a sixth antenna (A6). In this embodiment, the antenna array apparatus may further include a fifth beam forming circuit for applying beam weights $W_{b1,S2a}$ and $W_{b2,S2a}$ to port $S_{2a}$ and a sixth beam forming circuit for applying beam weights $W_{b1,T2b}$ and $W_{b2,T2b}$ to port $T_{2b}$.

In some embodiments, $W_{b2,S2a}$ is a function of $W_{b1,T2b}$ and $W_{b2,T2b}$ is a function of $W_{b1,S2a}$. For example, $W_{b2,S2a}$ may be a function of the complex conjugate of $W_{b1,T2b}$ and $W_{b2,T2b}$ is a function of the complex conjugate of $W_{b1,S2a}$. In some embodiments, $W_{b2,S2a}$ is determined by phase shifting and amplitude scaling the complex conjugate of $W_{b1,T2b}$. In some embodiments, the phase shift creates a sign shift. In some embodiments, the complex conjugate of $W_{b1,T2b}$ is shifted by pi ($\pi$). For instance, in some embodiments, $W_{b2,S2a}$ equals or substantially equals $e^{i(\beta+\pi)}(W_{b1,T2b})^{*}\alpha_3$ and $W_{b2,T2b}$ equals or substantially equals $e^{i\beta}(W_{b1,S2a})^{*}\alpha1/\alpha_3$.

In some embodiments, the first antenna element and the second antenna element are located symmetrically with respect to a symmetry point, and the third antenna element and the fourth antenna element are located symmetrically with respect to the symmetry point.

In some embodiments, the shape of the power beam pattern for the first beam and the shape of the power beam pattern for the second beam are the same or substantially the same in a plurality of directions of interest and the first beam and the second beam have orthogonal or substantially orthogonal polarizations in the coverage area.

In some embodiments, the antenna array apparatus further includes a weight determining unit configured to determine $W_{b2,S1a}$ and $W_{b2,T1b}$. In some embodiments, the weight determining unit is configured to determine $W_{b2,S1a}$ by obtaining the complex conjugate of $W_{b1,T1b}$ and (a) phase shifting the complex conjugate of $W_{b1,T1b}$ or (b) multiplying the complex conjugate of $W_{b1,T1b}$ by an amplitude scaling factor, thereby producing an amplitude scaled complex conjugate of $W_{b1,T1b}$, and phase shifting the amplitude scaled complex conjugate of $W_{b1,T1b}$. In some embodiments, the weight determining unit is configured to determine $W_{b2,T1b}$ by obtaining the complex conjugate of $W_{b1,S1a}$ and multiplying the complex conjugate of $W_{b1,S1a}$ by the inverse of the amplitude scaling factor. In some embodiments, the weight determining unit is configured to determine $W_{b2,S1a}$ by phase shifting the obtained complex conjugate of $W_{b1,T1b}$, thereby producing a phase shifted complex conjugate of $W_{b1,T1b}$, and multiplying the phase shifted complex conjugate of $W_{b1,T1b}$ by the amplitude scaling factor. In some embodiments, the weight determining unit is configured to phase shift the complex conjugate of $W_{b1,T1b}$ by phase shifting the complex conjugate of $W_{b1,T1b}$ by pi.

In another aspect, a method for creating two beams (a first beam and a second beam) is provided. In some embodiments, the method includes: using an antenna array to create said first beam and said second beam, wherein the array antenna comprises: a first antenna element (AE1-$a$) and a second antenna element (AE1-$b$) that together form a pair of antenna elements (AE1-$a$,AE1-$b$), the first antenna element (AE1-$a$) comprises an antenna element port ($S_{1a}$) connected to a first antenna (A1) and the second antenna element (AE1-$b$) comprises an antenna element port ($T_{1b}$) connected to a second antenna (A2). In some embodiments, the step of using the antenna array to create said first beam and said second beam comprises: applying beam weights $W_{b1,S1a}$ and $W_{b2,S1a}$ to antenna element port $S_{1a}$ and applying beam weights $W_{b1,T1b}$ and $W_{b2,T1b}$ to antenna element port $T_{1b}$. In some embodiments, $W_{b2,S1a}$ equals or substantially equals $e^{j(\beta+\pi)}(W_{b1,T1b})$ *$\alpha_1$, and $W_{b2,T1b}$ equals or substantially equals $e^{j\beta}(W_{b1,S1a})$ *$1/\alpha_1$.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Described herein are embodiments of an antenna array apparatus that can be used to create two beams (a first beam and a second beam) where (a) the shape of the power beam pattern for the first beam and the shape of the power beam pattern for the second beam are the same or substantially the same in a plurality of directions of interest (or UE coverage area), as opposed to in only a single direction of interest, and (b) each beam has an orthogonal or substantially orthogonal polarization with respect to the other beam in the UE coverage area. In some embodiments, the antenna array includes one or more of: (1) a pair of single port elements, which may be located symmetrically with respect to a symmetry point for the antenna array, (2) a pair of dual port antenna elements, which may be located symmetrically with respect to the symmetry point for the antenna array, and/or (3) a single dual port antenna element, which may be centered on the symmetry point.

Figure 1:
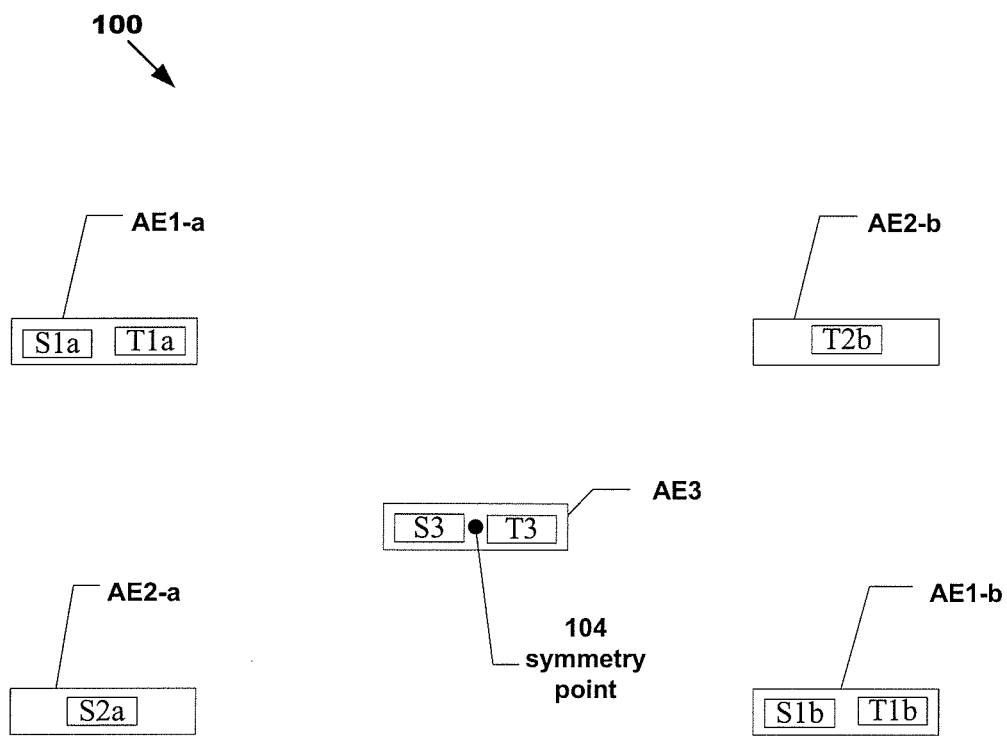
FIG. 1 illustrates an example antenna array.

FIG. 1 illustrates an example of such an antenna array apparatus 100. Example antenna array apparatus 100 includes: (1) a pair of dual port antenna elements (i.e., antenna elements AE1-$a$ and AE1-$b$); (2) a pair of single port antenna elements (i.e., antenna elements AE2-$a$ and AE2-$b$); and (3) a single dual port antenna element AE3. As shown in FIG. 1, antenna element pair AE1-$a$,AE1-$b$ and antenna element pair AE2-$a$,AE2-$b$ are each located symmetrically (or substantially symmetrically) with respect to a symmetry point 104 for antenna array apparatus 100. That is, for example, each antenna of antenna element AE1-$a$ (i.e., antennas A1 and A3—see FIG. 2) and the corresponding antennas of antenna element AE1-$b$ (i.e., antennas A2 and A4, respectively) are equidistant from symmetry point 104, a straight line going from the phase center of antenna A1 to the phase center of antenna A2 passes through symmetry point 104, and a straight line going from the phase center of antenna A3 to the phase center of antenna A4 passes through symmetry point 104. Likewise, the antenna of antenna element AE2-$a$ (i.e., antenna A5—see FIG. 3) and the antenna of antenna element AE2-$b$ (i.e., antenna A6) are equidistant from symmetry point 104 and a straight line going from the phase center of antenna A5 to the phase center of antenna A6 passes through symmetry point 104. Antenna element AE3 is centered on symmetry point 104 (e.g., the phase centers of the antennas of element AE3 are equidistant from the symmetry point and a straight line going from the phase centers of the antennas passes through symmetry point 104).

As further shown in FIG. 1, antenna elements AE1-$a$, AE1-$b$, and AE3, each have two ports: an "S" port and a "T" port. More specifically, antenna element AE1-$a$ has ports S1$a$ and T1$a$, antenna element AE1-$b$ has ports S1$b$ and T1$b$, and antenna element AE3 has ports S3 and T3. As also shown in FIG. 1, antenna elements AE2-$a$ an AE2-$b$ each have a single port. Antenna element AE2-*a* has a single S port (S2*a*) and Antenna element AE2-*b* has a single T port (T2*b*).

While antenna array apparatus 100 may appear to be a 2-dimensional antenna array, the invention is not so limiting. Antenna array apparatus 100 may be a 1, 2 or 3-dimensional array.

Figure 2:
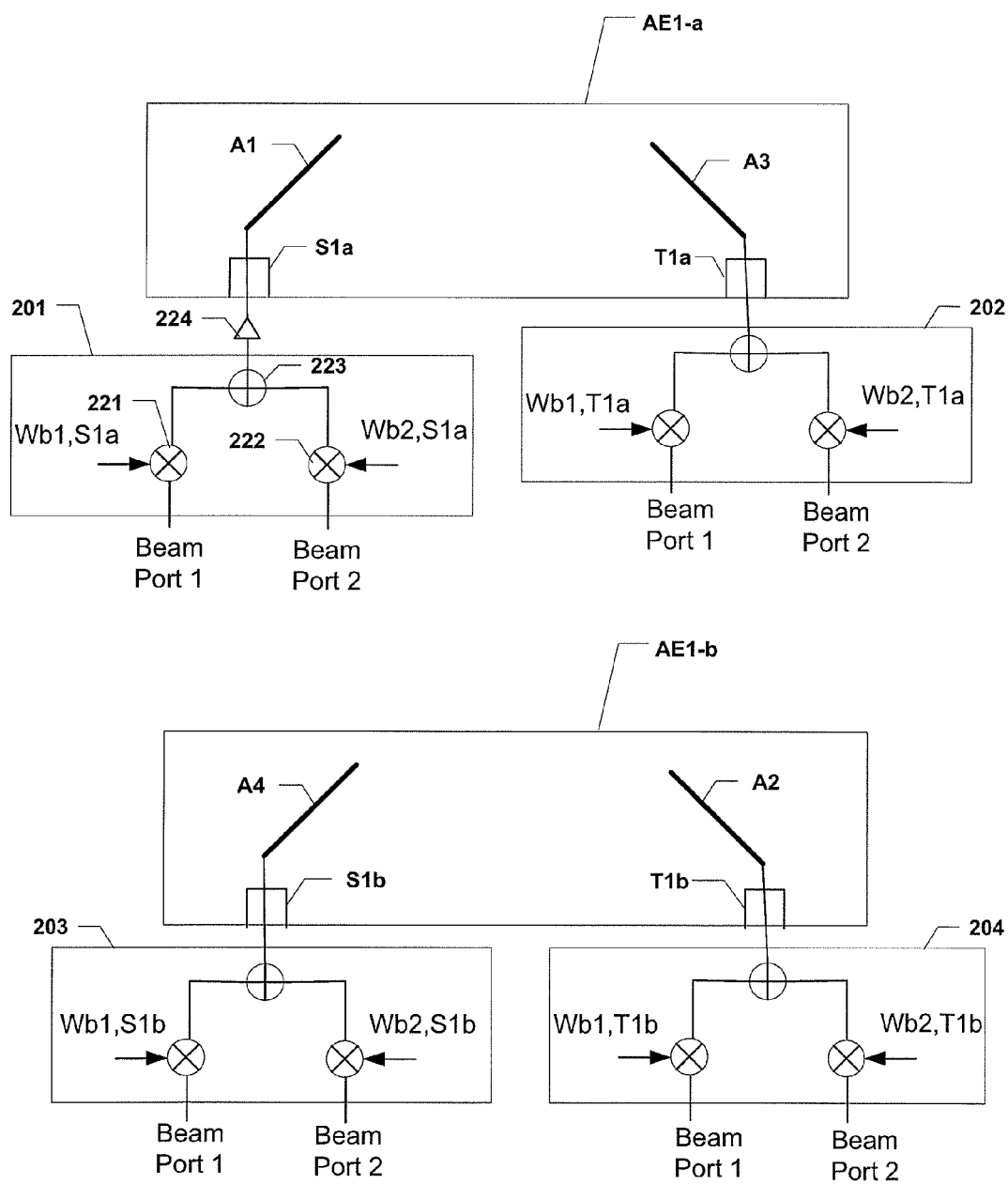
FIG. 2 further illustrates a first portion of the example antenna array.

FIG. 2 further illustrates a portion of antenna array apparatus 100. That is, FIG. 2 further illustrates antenna elements AE1-*a* and AE1-*b* and shows beam forming circuits 201-204 of antenna array apparatus 100. As shown in FIG. 2, each antenna element port of antenna elements AE1-*a,b* is electrically connected to an antenna. Specifically, antenna element port S1*a* is connected to antenna A1, antenna element port T1*a* is connected to antenna A3, antenna element port S1*b* is connected to antenna A4, and antenna element port T1*b* is connected to antenna A2.

The structure of the antennas A1-A4 is not significant. For example, the antennas A1-A4 may consist of a single radiating element or may comprise, among other things, a plurality of radiating elements. Additionally, while the antennas within the antenna elements AE1-*a* and AE1-*b* are shown as being spaced apart, this is not a requirement. In some embodiments, however, certain characteristics of antennas A1-A4 are significant. For instance, in some embodiments, antenna A1 may have an arbitrary polarization, but antennas A2 and A3 each have a polarization that is orthogonal or substantially orthogonal to the polarization of antenna A1, and antenna A4 has a polarization that is orthogonal or substantially orthogonal to the polarization of antennas A2 and A3. Similarly, in some embodiments, the power pattern for antenna A1 is the same or substantially the same as the power pattern for antenna A2 and the power pattern for antenna A3 is the same or substantially the same as the power pattern for antenna A4.

As shown in FIG. 2, each antenna element port of antenna elements AE1-*a* and AE1-*b* is connected to a beam forming circuit. In some embodiments, as shown, the beam forming circuits 201-204 have the same basic structure. In the embodiment shown, each beam forming circuit includes: a first multiplier 221 connected to a first beam port ("beam port 1") of antenna array apparatus 100 for multiplying the signal injected into beam port 1 of antenna array with a beam weight (e.g., a complex beam weight) associated with the first beam; a second multiplier 222 connected to a second beam port ("beam port 2") of antenna array apparatus 100 for multiplying the signal injected into beam port 2 of antenna array with a beam weight associated with the second beam; and a combiner 223, connected to the antenna element port, for combining the outputs of multipliers 221,222 and providing the resulting combined signal to the antenna element port to which combiner 223 is connected. As also shown, a beam forming circuit (e.g., beam forming circuit 201) may connect to an antenna element port through one or more circuit elements (e.g., amplifier 224 and/or other circuit element such as a signal processing element). Beam forming circuits 201-204 may be implemented using a signal processing element (e.g., a digital signal processor (DSP)) or other processor (e.g., an application specific integrated circuit (ASIC), a microprocessor). In the embodiment shown, for each antenna element port S1*a*, S1*b*, T1*a* and T1*b*, two beam weights are applied to the antenna element port—a beam weight for the first beam $W_{b1}$ and a beam weight for the second beam $W_{b2}$. More specifically, beam weights $W_{b1,S1a}$ and $W_{b2,S1a}$ are applied to antenna element port S1*a*, beam weights $W_{b1,T1a}$ and $W_{b2,T1a}$ are applied to antenna element port T1*a*, beam weights $W_{b1,S1b}$ and $W_{b2,S1b}$ are applied to antenna element port S1*b*, and beam weights $W_{b1,T1b}$ and $W_{b2,T1b}$ are applied to antenna element port T1*b*.

In some embodiments, the $W_{b2}$ beam weight for a particular S antenna element port of a particular antenna element is function of the $W_{b1}$ beam weight for the T antenna element port corresponding to the particular S antenna element port (a.k.a., the "corresponding" T port)—the corresponding T antenna element port is the T antenna element port of the antenna element that is paired with the particular antenna element that includes the particular S antenna element port in question. Similarly, the $W_{b2}$ beam weight for a particular T antenna element port of a particular antenna element is function of the $W_{b1}$ beam weight for the corresponding S antenna element port (i.e., the S antenna element port of the antenna element that is paired with the particular antenna element that includes the particular T antenna element port). For example, $$W_{b2,Sxa}=F1(W_{b1,Txb}),$$

$$W_{b2,Sxb}=F1(W_{b1,Txa}),$$

$$W_{b2,Txa}=F2(W_{b1,Sxb}), \text{ and}$$

$$W_{b2,Txb}=F2(W_{b1,Sxa}).$$

In some embodiments, $W_{b2,Sxa}$ and $W_{b2,Sxb}$ may be a function of the complex conjugate of $W_{b1,Txb}$ and $W_{b2,Txa}$, respectively. Similarly, $W_{b2,Txa}$ and $W_{b2,Txb}$ may be a function of the complex conjugate of $W_{b1,Sxb}$ and $W_{b2,Sxa}$, respectively. In some embodiments, $W_{b2,Sxa}$ an $W_{b2,Sxb}$ are determined by phase shifting and amplitude scaling the complex conjugate of $W_{b1,Txb}$ and $W_{b1,Txa}$, respectively. In some embodiments, the phase shift creates a sign shift. In some embodiments, the complex conjugate of $W_{b1,T1b}$ is shifted by β+pi and the complex conjugate of $W_{b1,T1a}$ is shifted by β+pi. In some embodiments, $W_{b2,Txa}$ and $W_{b2,Txb}$ are determined by amplitude scaling the complex conjugate of $W_{b1,Sxb}$ and $W_{b1,Sxa}$, respectively.

In some particular embodiments, $$F1(W_{b1,Tx}) \text{ equals or substantially equals } e^{i(\beta+\pi)}(W_{b1,Tx})^* \alpha_1, \text{ and}$$

$$F2(W_{b1,Sx}) \text{ equals or substantially equals } e^{i\beta}(W_{b1,Sx})^* 1/\alpha_1, \text{ where}$$

$(W_{b1,Sx})^*$ is the complex conjugate of $W_{b1,Sx}$ and $(W_{b1,Tx})^*$ is the complex conjugate of $W_{b1,Tx}$, and $\alpha_1$ is an amplitude scaling factor.

In some embodiments, the value of beta (β) ranges from 0 to 2π, 0 being preferred. The value $\alpha_1$ may be a function of the power of the signals emitted by the antennas connected to the corresponding antenna element ports, assuming equal input power on the two antenna element ports. Thus, for example, in the equation $W_{b2,S1a}$ equals or substantially equals $e^{i(\beta+\pi)}(W_{b1,T1b})^* \alpha_1$, $\alpha_1$ is a function of the power of the signal emitted by antenna A2 in a direction (d) (i.e., $P(d)_{A2}$) and the power of the signal emitted by antenna A1 in the direction d (i.e., $P(d)_{A1}$). In some embodiments, $\alpha_1$ equals or substantially equals $\text{Sqrt}(P(d)_{A2}/P(d)_{A1})$. In many cases, in practice $\alpha_1=1$.

In the example embodiment described above, the vector of $W_{b2}$ beam weights for the ports shown in FIG. 2 is as follows:

$$W_{b2,S1a} \text{ equals or substantially equals } e^{i(\beta+\pi)}(W_{b1,T1b})^* \alpha_1,$$

$$W_{b2,S1b} \text{ equals or substantially equals } e^{i(\beta+\pi)}(W_{b1,T1a})^* \alpha_1,$$

$W_{b2,T1a}$ equals or substantially equals $e^{j\beta}(W_{b1,S1b})*1/\alpha_1$, and $W_{b2,T1b}$ equals or substantially equals $e^{j\beta}(W_{b1,S1a})*1/\alpha_1$.

Figure 3:
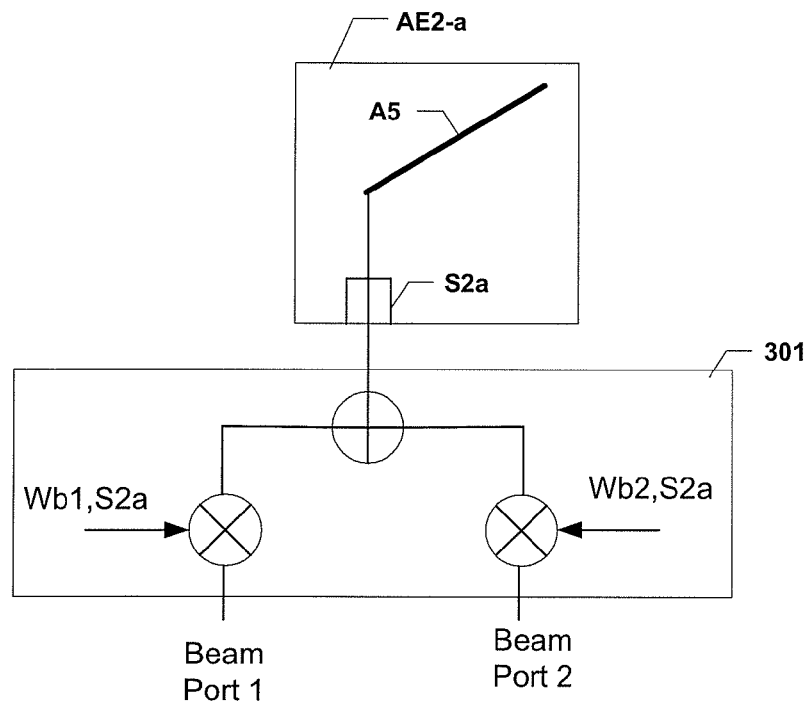
FIG. 3 further illustrates a second portion of the example antenna array.
Figure 3:
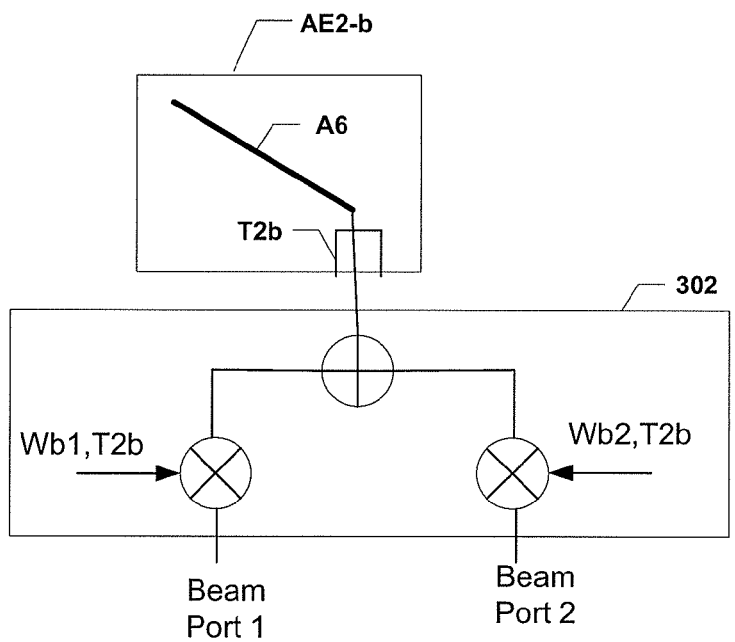

FIG. 3 further illustrates another portion of antenna array apparatus 100. That is, FIG. 3 further illustrates antenna elements AE2-a and AE2-b and shows beam forming circuits 301 and 302 of antenna array apparatus 100. As shown in FIG. 3, each antenna element port of antenna elements AE2-a and AE2-b is electrically connected to an antenna. Specifically, antenna element port S2a is connected to antenna A5 and antenna element port T2b is connected to antenna A6. The structure of the antennas A5-A6 is not significant. However, in some embodiments, certain characteristics of antennas A5-A6 are significant. For instance, in some embodiments, antenna A5 may have an arbitrary polarization, but antenna A6 has a polarization that is orthogonal or substantially orthogonal to the polarization of antenna A5. Similarly, in some embodiments, the power pattern for antenna A5 is the same or substantially the same as the power pattern for antenna A6.

As shown in FIG. 3, each antenna element port of antenna elements AE2-a and AE2-b is connected to a beam forming circuit that is used to apply to the antenna element port two beam weights (a $W_{b1}$ beam weight for beam 1 and a $W_{b2}$ beam weight for beam 2). More specifically, beam weights $W_{b1,S2a}$ and $W_{b2,S2a}$ are applied to antenna element port S2a and beam weights $W_{b1,T2b}$ and $W_{b2,T2b}$ are applied to antenna element port T2b.

As described above, in some embodiments, the $W_{b2}$ beam weight for a particular S antenna element port of a particular antenna element is function of the $W_{b1}$ beam weight for the corresponding T antenna element port. Similarly, the $W_{b2}$ beam weight for a particular T antenna element port of a particular antenna element is function of the $W_{b1}$ beam weight for the corresponding S antenna element port.

In the example embodiment described above, the $W_{b2}$ beam weights for the antenna element ports shown in FIG. 3 is as follows:

$W_{b2,S2a}$ equals or substantially equals $e^{j(\beta+\pi)}(W_{b1,T2b})*\alpha_2$, $W_{b2,T2b}$ equals or substantially equals $e^{j\beta}(W_{b1,S2a})*1/\alpha_2$.

Figure 4:
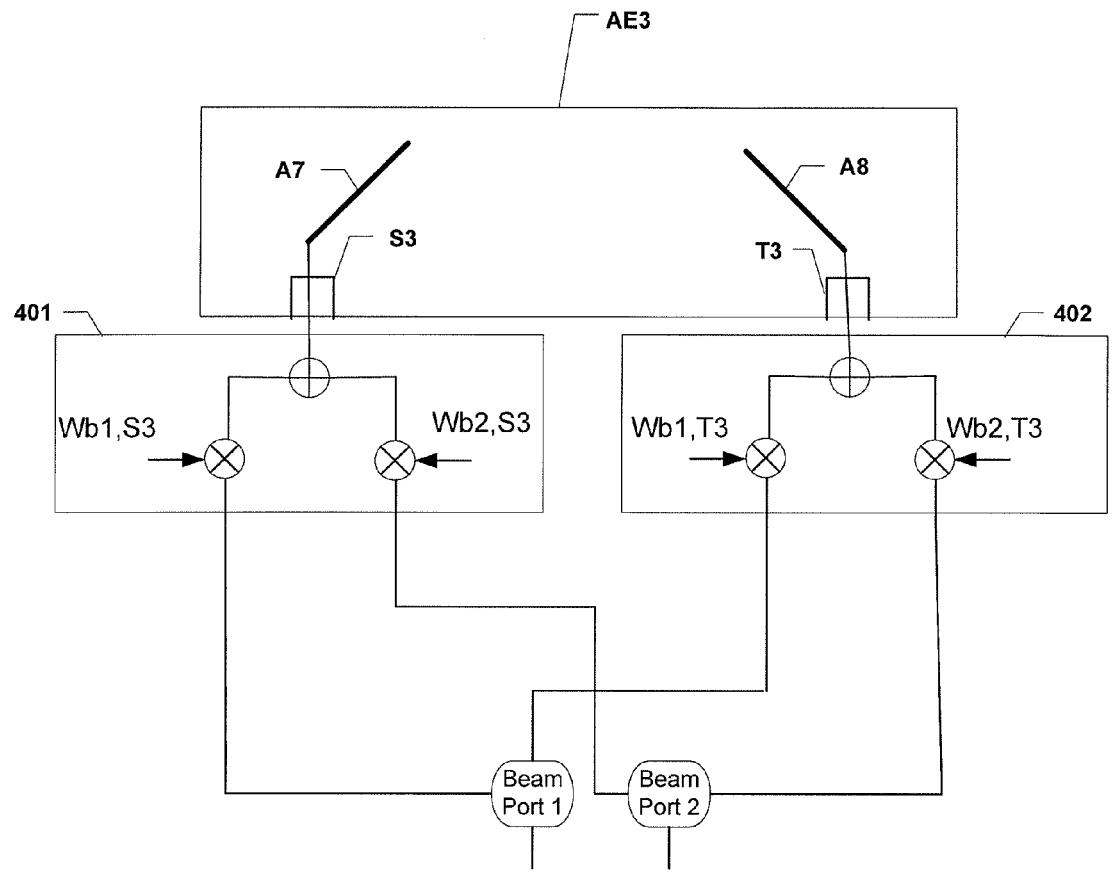
FIG. 4 further illustrates a third portion of the example antenna array.

FIG. 4 illustrates antenna elements AE3, according to some embodiments, and shows beam forming circuits 401 and 402 of antenna array apparatus 100. As shown in FIG. 4, each port of antenna element AE3 is electrically connected to an antenna. Specifically, antenna element port S3 is connected to antenna A7 and antenna element port T3 is connected to antenna A8. The structure of the antennas A7-A8 is not significant. However, in some embodiments, certain characteristics of antennas A7-A8 are significant. For instance, in some embodiments, antenna A7 may have an arbitrary polarization, but antenna A8 has a polarization that is orthogonal or substantially orthogonal to the polarization of antenna A7. Similarly, in some embodiments, the power pattern for antenna A7 is the same or substantially the same as the power pattern for antenna A8.

As shown in FIG. 4, each antenna element port of antenna element AE3 is connected to a beam forming circuit that is used to apply to the antenna element port two beam weights (one for beam 1 and one for beam 2). More specifically, beam weights $W_{b1,S3}$ and $W_{b2,S3}$ are applied to antenna element port S3 and beam weights $W_{b1,T3}$ and $W_{b2,T3}$ are applied to antenna element port T3.

As described above, in some embodiments, the $W_{b2}$ beam weight for a particular S antenna element port of a particular antenna element is function of the $W_{b1}$ beam weight for the corresponding T antenna element port, and the $W_{b2}$ beam weight for a particular T antenna element port of a particular antenna element is function of the $W_{b1}$ beam weight for the corresponding S antenna element port. In the example embodiment described above, the $W_{b2}$ beam weights for the antenna element ports shown in FIG. 4 is as follows:

$W_{b2,S3}$ equals or substantially equals $e^{j(\beta+\pi)}(W_{b1,T3})*\alpha_3$, $W_{b2,T3}$ equals or substantially equals $e^{j\beta}(W_{b1,S3})*1/\alpha_3$.

Figure 5:
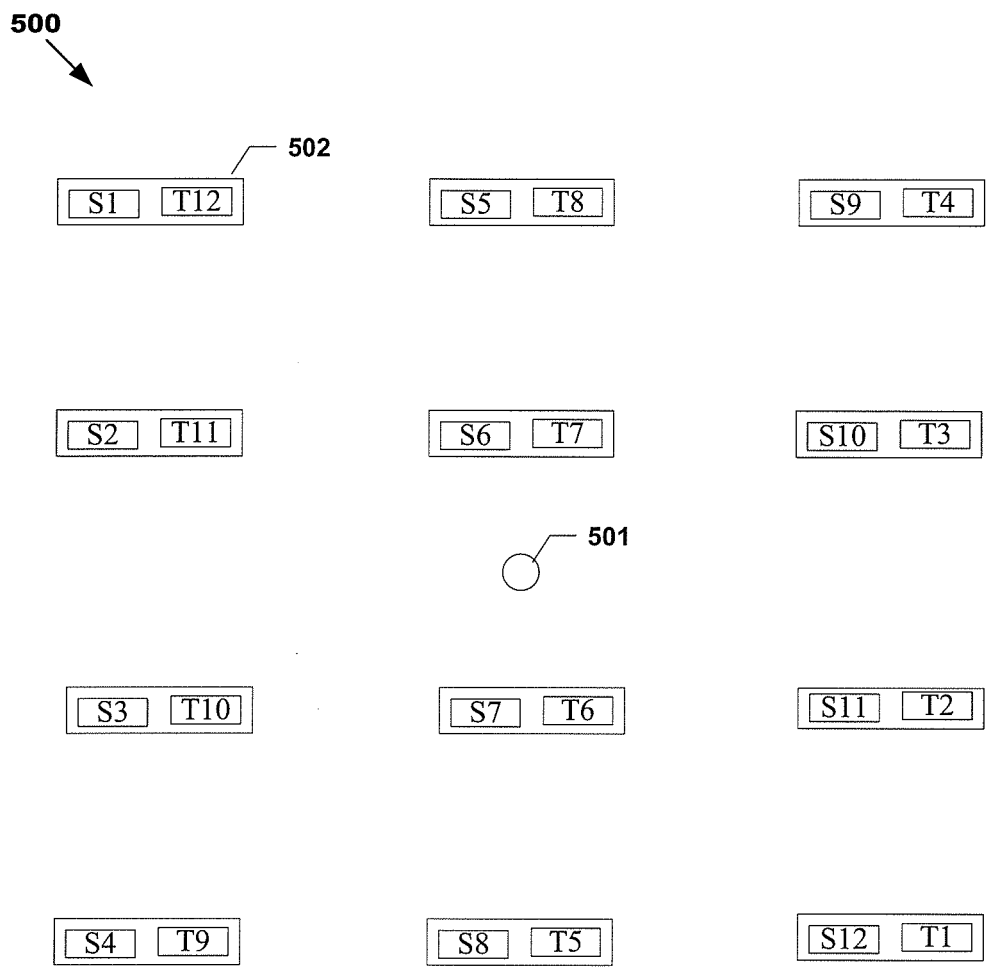
FIG. 5 illustrates an example 2-dimensional antenna array.

Referring now to FIG. 5, FIG. 5 illustrates an example 2-dimensional antenna array 500 for forming two beams (a first beam and a second beam) where (a) the shape of the power beam pattern for the first beam and the shape of the power beam pattern for the second beam are the same or substantially the same in a plurality of directions and (b) each beam has an orthogonal or substantially orthogonal polarization with respect to the other beam in the UE coverage area. In this example, all of the antenna elements 502 of antenna array 500 are dual-port antenna elements that have an S antenna port and a T antenna port. The indexes that are used to name the S antenna ports and T antenna ports is arbitrary, but, as will be seen below, the naming scheme used in FIG. 5 has the advantage making it easy to show the relationship between beam weights.

Antenna array 500 has six pairs of antenna elements. That is, each of the twelve antenna elements 502 of antenna array 500 is paired with another antenna element. More specifically, an antenna element 502 having port Sx (where x<7) is paired with antenna element 502 having port Sy, where y=13−x. Thus, for example, the antenna element having ports S1 and T12 is paired with the antenna element having ports S12 and T1. Antenna array 500 also has a symmetry point 501. In the example embodiment shown, each pair of antenna elements is located symmetrically with respect to symmetry point 501.

Although not shown, antenna array 500 includes a beam forming circuit for each antenna element port. As described above, each beam forming circuit is used to apply two beam weights—a beam weight $W_{b1}$ for the first beam and a beam weight $W_{b2}$ for the second beam—to the antenna element port to which the beam forming circuit is connected.

Using the same beam weight rule described above, the vector of $W_{b2}$ beam weights for the ports shown in FIG. 4 is as follows:

$W_{b2,Sx}$ equals or substantially equals $e^{j(\beta+\pi)}(W_{b1,Tx})*\alpha_x$, $W_{b2,Tx}$ equals or substantially equals $e^{j\beta}(W_{b1,Sx})*1/\alpha_x$, where $x=1, 2, \ldots, 12$.

Example Beam Pattern

An example antenna array for producing an example beam pattern is a four column antenna array with five dual port antenna elements per column. Column separation is 0.5 wavelengths and separation within a column is 0.847 wavelengths. All antenna elements are identical, having perfectly orthogonal polarizations in all directions (at least those of interest). The weight vector for the first beam (B1) contains 40 complex beam weights. The beam weight applied to S ports, identical weight in columns 1 through 4, for elevation domain beam forming is here found as $$w_{s,B1,Ell to 5} = \begin{bmatrix} 0.500 \\ 0 \\ 0.1121 + i0.4873 \\ -0.2693 + i0.4213 \\ -0.4074 - i0.2899 \end{bmatrix}$$

The weight applied to S ports, identical weight to all 5 ports in the column, for azimuth beam forming is found as.

$$w_{s,B1,Az1to4} = \begin{bmatrix} -0.9959 + i0.0786 \\ -0.2562 - i0.9666 \\ 1 \\ -0.0861 + i0.9953 \end{bmatrix}$$

The total weight for the S ports is found by multiplying these weight vectors according to $$W_{s,B1,1to20} = w_{s,B1,Ell to 5} w_{s,B1,Az1to4}^T$$

resulting in a matrix with 20 (5 rows×4 columns) elements. This matrix can then be vectorized by taking the weights, column by column, forming a column vector with 20 elements.

The weights applied to the T ports are found in a similar way. Again, the weight applied to columns 1 through 4, for elevation domain beam forming is identical and here found as $$w_{t,B1,Ell to 5} = \begin{bmatrix} -0.4074 + i0.2899 \\ -0.2693 - i0.4213 \\ 0.1121 - i0.4873 \\ 0 \\ 0.500 \end{bmatrix}$$

The weight applied to T ports, identical weight to all 5 elements in the column, for azimuth beam forming is found as $$w_{t,B1,Az1to4} = \begin{bmatrix} -0.2244 - i0.6154 \\ 0.1743 - i0.6314 \\ 0.6550 \\ 0.5353 + i0.3764 \end{bmatrix}$$

The total weight for the T ports is found by multiplying these weight vectors according to $$W_{t,B1,1to20} = w_{t,B1,Ell to 5} w_{t,B1,Az1to4}^T$$

Finally the total weight vector for beam 1, containing 40 elements, is found as $$w_{B1} = \begin{bmatrix} w_{s,B1,1to20} \\ w_{t,B1,1to20} \end{bmatrix}$$

The weight vector for the second beam is found by applying the method described above and with β set to 0 and a set to 1.

Figure 6A:
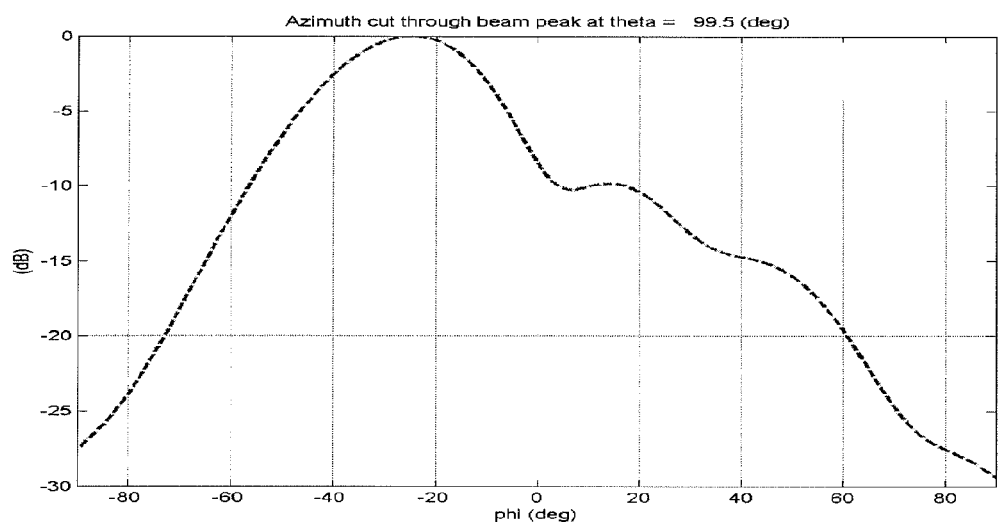
FIGS. 6A, 6B are graphs showing beam power patterns.
Figure 6B:
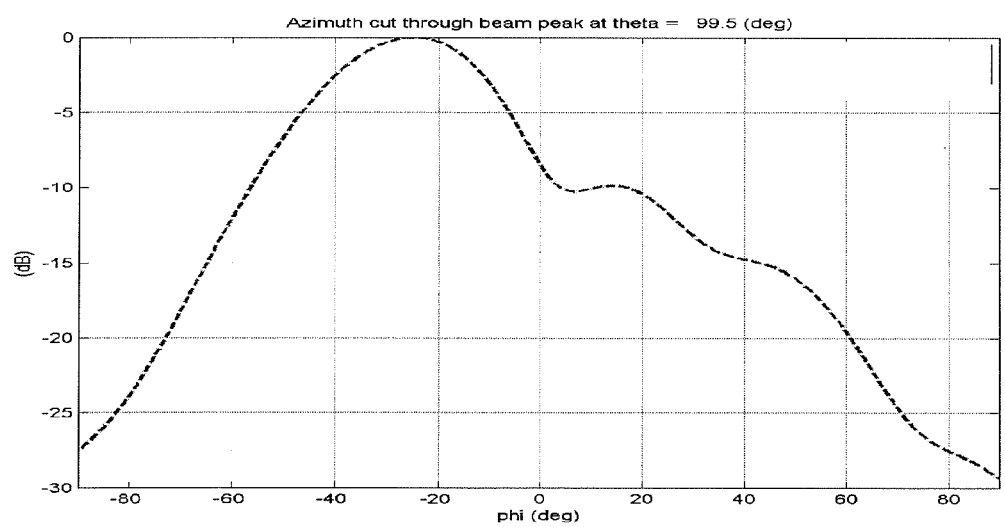
Figure 7A:
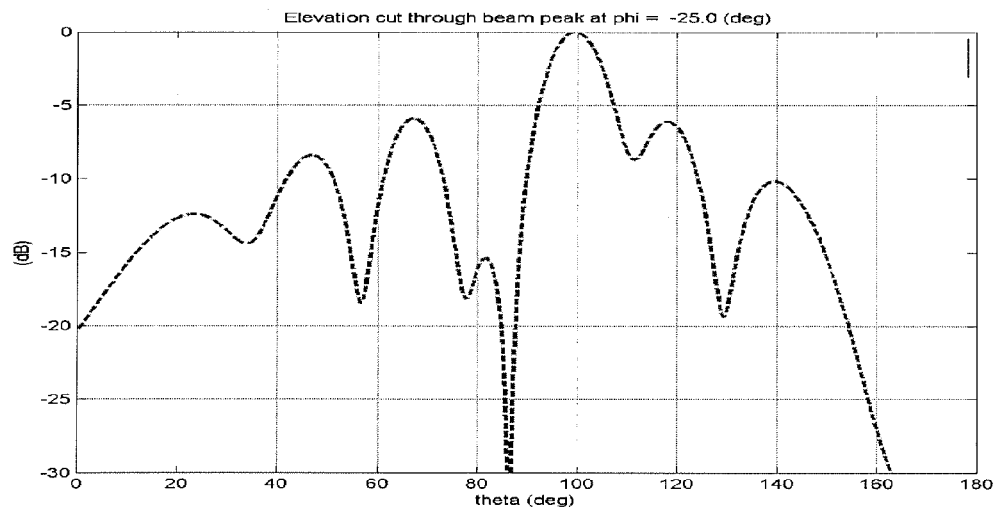
FIGS. 7A, 7B are graphs showing beam power patterns.
Figure 7B:
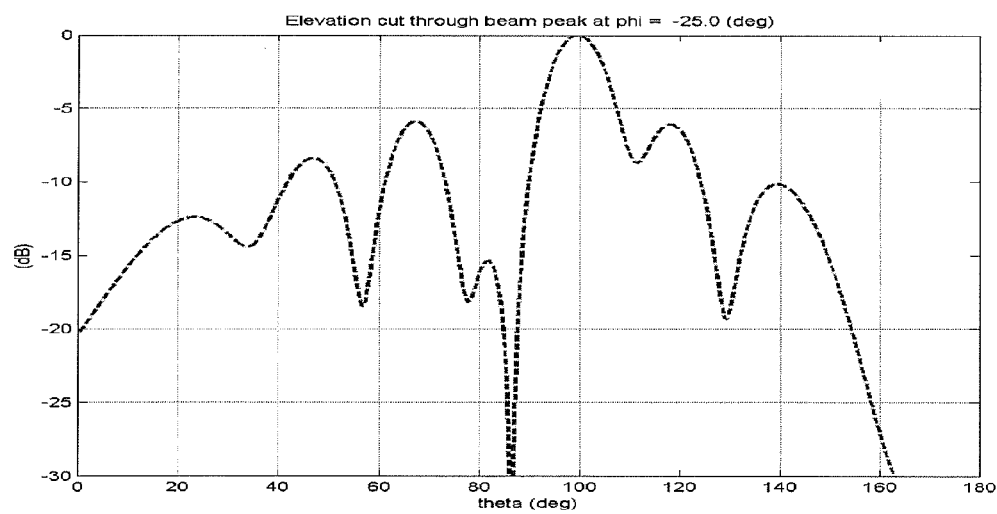
Figure 8:
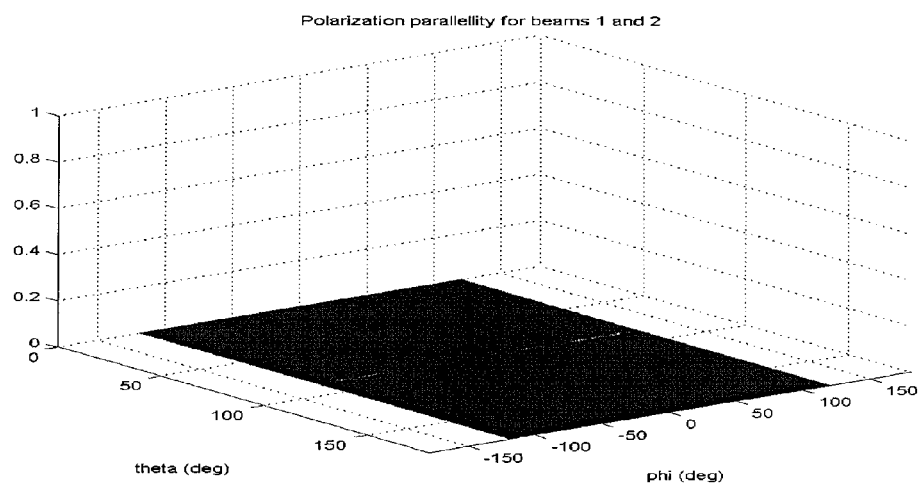
FIG. 8 is a graph showing that the polarizations for two beams are orthogonal in all directions.

FIGS. 6A, 6B show power patterns for beams 1 and 2, respectively, for an azimuth cut via beam peak. As can be seen from FIGS. 6A-6B, the beams have identical power patterns. FIGS. 7A, 7B show power patterns for beams 1 and 2, respectively, for an elevation cut via beam peak. As can be seen from the figures the beams have identical power patterns. FIG. 8 shows that polarizations for beams 1 and 2 are orthogonal in all directions.

Figure 9:
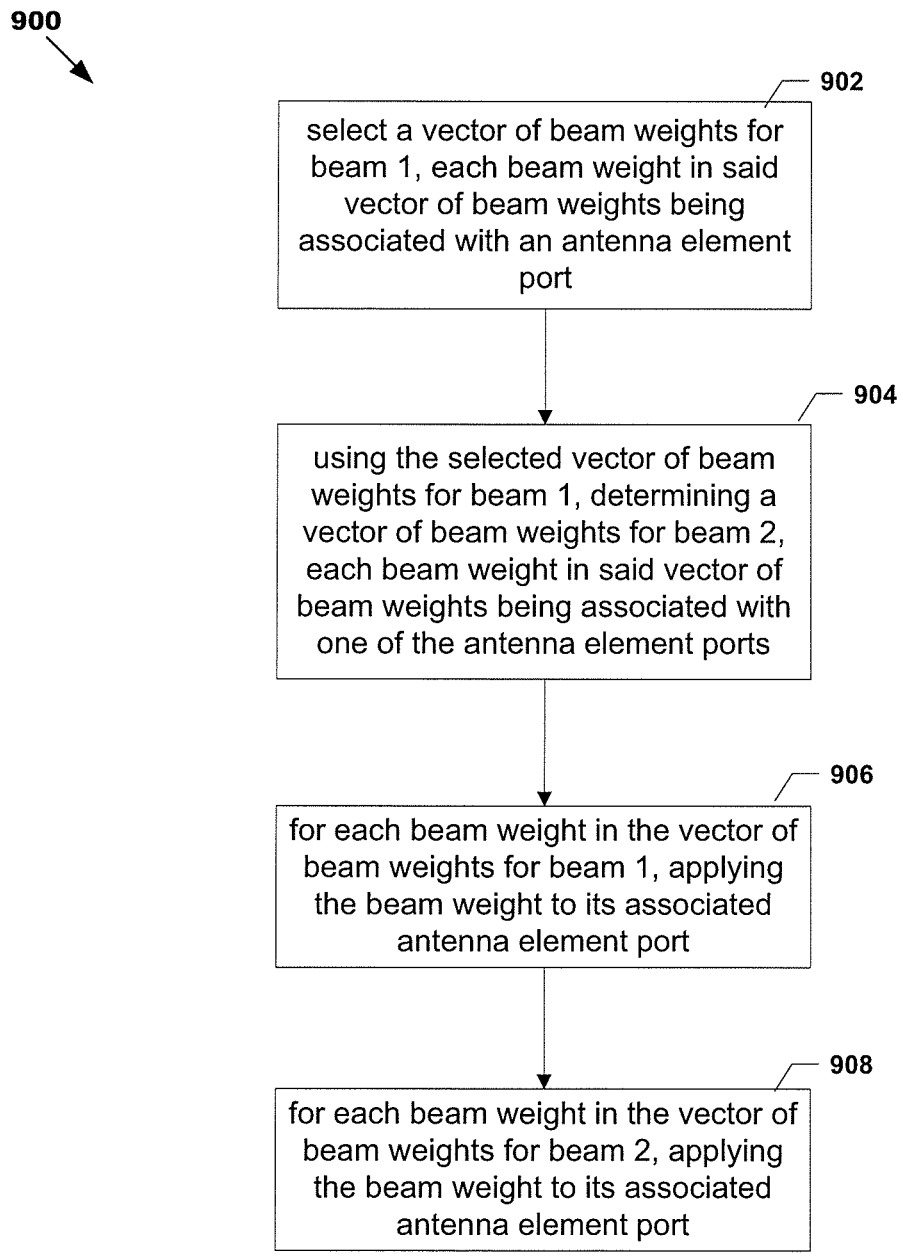
FIG. 9 is a flow chart illustrating a process according to an embodiment of the invention.

FIG. 9 is a flow chart illustrating a process 900 for using an antenna array to produce a first beam (beam 1) and a second beam (beam 2). Process 900 begins in step 902, where a vector of beam weights for beam 1 is selected (each beam weight in the vector of beam weights for beam 1 is associated with an antenna element port of the antenna array). In step 904, the selected vector of beam weights for beam 1 is used to determine a vector of beam weights for beam 2 (each beam weight in the vector of beam weights for beam 2 is associated with one of the antenna element ports). In step 906, for each beam weight in the vector of beam weights for beam 1, the beam weight is applied to its associated antenna element port. In step 908, for each beam weight in the vector of beam weights for beam 2, the beam weight is applied to its associated antenna element port. In some embodiments, a beam weight for beam 1 is applied to an antenna element port by using a beam forming circuit connected to the antenna element port to multiply the beam weight for beam 1 with a signal injected into beam port 1 of the antenna array, and a beam weight for beam 2 is applied to the antenna element port by using the beam forming circuit to multiply the beam weight for beam 2 with (i) a signal injected into beam port 2 of the antenna array or (ii) the signal injected into beam port 1 of the antenna array, where the beam forming circuit is configured to provide the resulting signals to the antenna element port (e.g., see FIG. 2).

Figure 10:
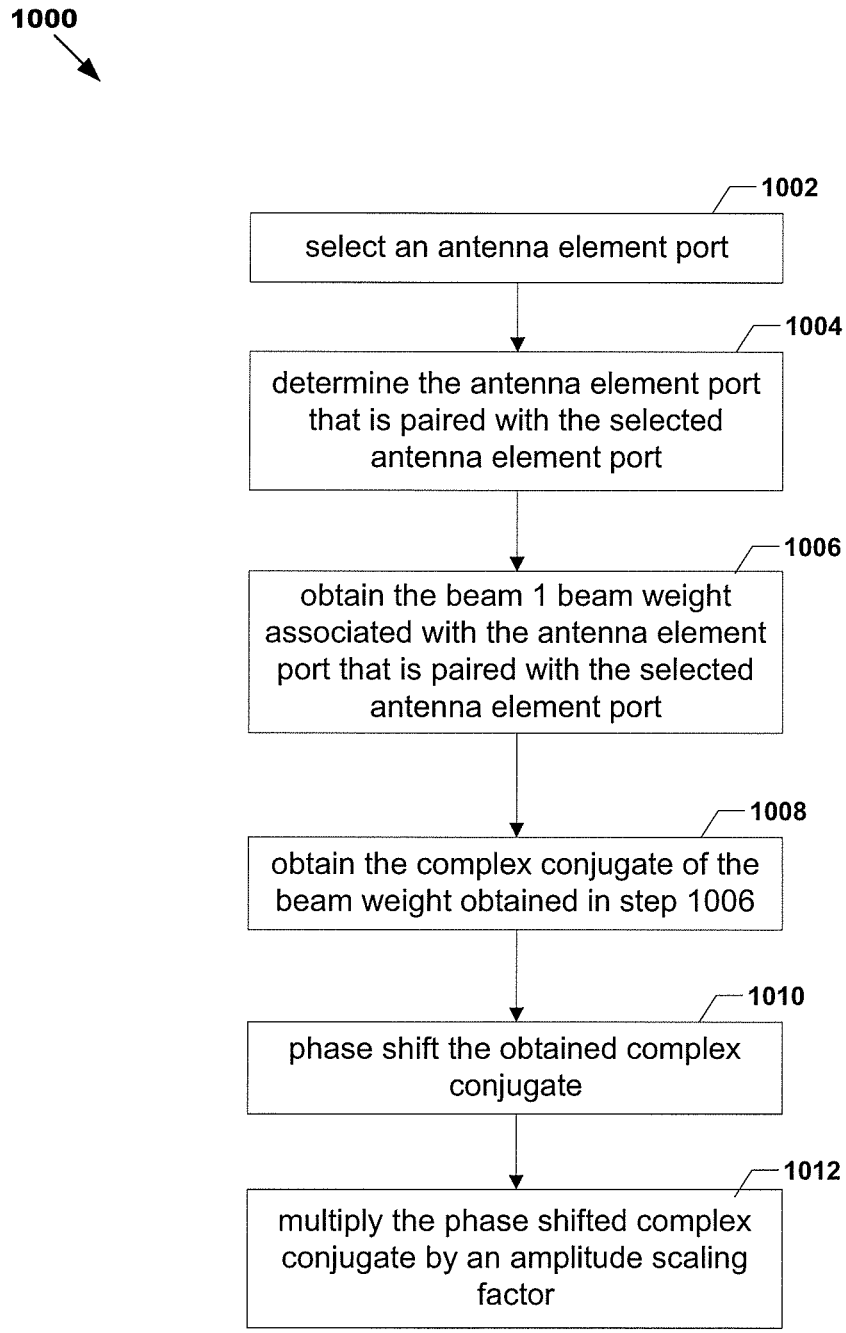
FIG. 10 is a flow chart illustrating a process for determining a beam weight according to an embodiment of the invention.

Referring now to FIG. 10, FIG. 10 illustrates a process 1000 for determining the beam weight for beam 2 that is associated with a selected antenna element port. Process 1000 may being in step 1002, where an antenna element port is selected (e.g., antenna element $S_{1a}$ is selected). In step 1004, the antenna element port that is paired with the selected antenna element port is determined. For example, if antenna element port $S_{1a}$ is selected in step 1002, then antenna element port $T_{1b}$ is determined in step 1004, because that is the port that is paired with antenna element port $S_{1a}$. In step 1006, the beam 1 beam weight associated with the antenna element port that is paired with the selected antenna element port is obtained. In step 1008, the complex conjugate of the beam weight obtained in step 1006 is obtained. In step 1010, the obtained complex conjugate is phase shifted. In step 1012, the phase shifted complex conjugate is multiplied by an amplitude scaling factor. In some embodiments, the obtained complex conjugate is multiplied by the scaling factor prior to being phase shifted.

Figure 11:
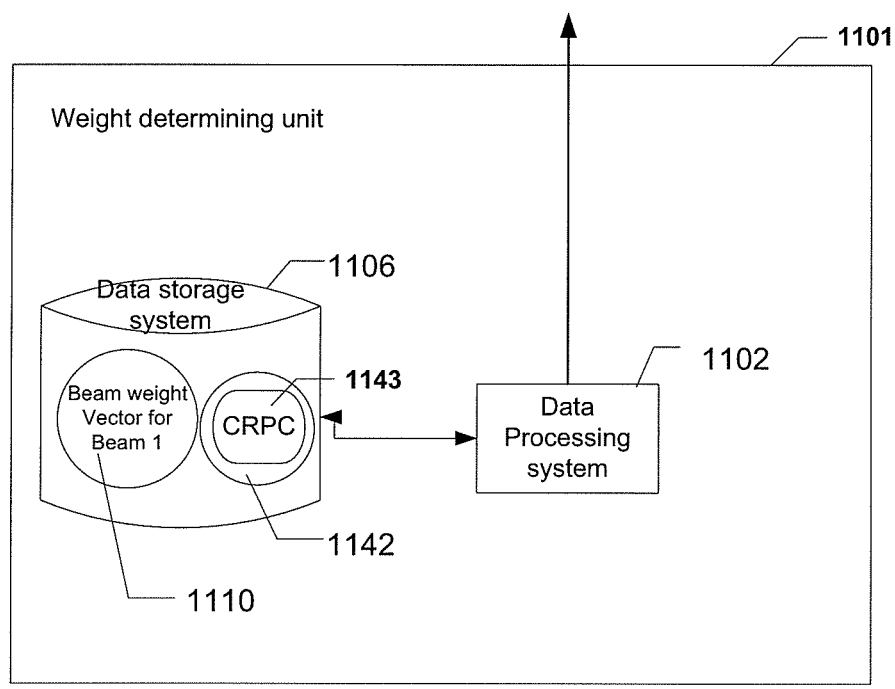
FIG. 11 illustrates a weight determining unit according to an embodiment of the invention.

Referring now to FIG. 11, FIG. 11 illustrates a block diagram of a weight determining unit 1101 according to some embodiments of the invention. As shown in FIG. 11, weight determining unit 1101 may include: a data processing system 1102, which may include one or more processors (e.g., a microprocessor, a DSP) and/or one or more circuits, such as an application specific integrated circuit (ASIC), Field-programmable gate arrays (PPGAs), etc; and data storage system 1106, which may include one or more non-volatile storage devices and/or one or more volatile storage devices (e.g., random access memory (RAM)). As shown, data storage system 1106 may be used to store a vector of beam weights for a first beam (beam 1). In embodiments where data processing system 1102 includes a microprocessor, computer readable program code (CRPC) 1143 may be stored in a computer readable medium 1142, such as, but not limited, to magnetic media (e.g., a hard disk), optical media (e.g., a DVD), memory devices (e.g., random access memory), etc. In some embodiments, computer readable program code 1143 is configured such that when executed by a processor, code 1143 causes route weight determining unit 1101 to perform steps described above (e.g., steps describe above with reference to the flow chart shown in FIG. 10). In other embodiments, weight determining unit 1101 is configured to perform steps described above without the need for code 1143. That is, for example, data processing system 1102 may consist merely of one or more ASICs. Hence, certain features of the present invention described above may be implemented in hardware and/or software. For example, in particular embodiments, the functional components of weight determining unit 1101 described above may be implemented by data processing system 1102 executing computer instructions 1143, by data processing system 1102 operating independent of any computer instructions 1143, or by any suitable combination of hardware and/or software.

While various embodiments of the present invention have been described above, it should be understood that they have been presented by way of example only, and not limitation. Thus, the breadth and scope of the present invention should not be limited by any of the above described exemplary embodiments. Moreover, any combination of the above described elements in all possible variations thereof is encompassed by the invention unless otherwise indicated herein.

Additionally, while the methods described above and/or illustrated in the drawings include a sequence of steps, this was done solely for the sake of illustration. Accordingly, it is contemplated that some steps may be added, some steps may be omitted, the order of the steps may be rearranged, and some steps may be performed in parallel.

The invention claimed is:

1. A method for creating two beams, a first beam and a second beam, the method comprising:
using an antenna array to create said first beam and said second beam, wherein
the antenna array comprises: a first antenna element (AE1-$a$) and a second antenna element (AE1-$b$) that together form a pair of antenna elements (AE1-$a$,AE1-$b$), the first antenna element (AE1-$a$) comprises an antenna element port ($S_{1a}$) connected to a first antenna (A1) and the second antenna element (AE1-$b$) comprises an antenna element port ($T_{1b}$) connected to a second antenna (A2); and
the step of using the antenna array to create said first beam and said second beam comprises:
applying beam weights $W_{b1, S1a}$ and $W_{b2, S1a}$ to antenna element port $_{S1a}$; and
applying beam weights $W_{b1, T1b}$ and $W_{b2, T1b}$ to antenna element port $T_{1b}$, wherein
$W_{b2, S1a}$ is a function of $W_{b1, T1b}$, and
$W_{b2, T1b}$ is a function of $W_{b1, S1a}$.

2. The method of claim 1, wherein
$W_{b2, S1a}$ is a function of the complex conjugate of $W_{b1, T1b}$, and
$W_{b2, T1b}$ is a function of the complex conjugate of $W_{b1, S1a}$.

3. The method of claim 2, further comprising determining $W_{b2, S1a}$, wherein
the step of determining $W_{b2, S1a}$ includes (a) phase shifting the complex conjugate of $W_{b1, T1b}$ or (b) multiplying the complex conjugate of $W_{b1, T1b}$ by amplitude scaling factor, thereby producing an amplitude scaled complex conjugate of $W_{b1, T1b}$, and phase shifting the amplitude scaled complex conjugate of $W_{b1, T1b}$.

4. The method of claim 3, wherein
the step of determining $W_{b2, S1a}$ includes phase shifting the complex conjugate of $W_{b1, T1b}$ and multiplying the phase shifted complex conjugate of $W_{b1, T1b}$ by the amplitude scaling factor.

5. The method of claim 4, wherein the step of phase shifting comprises phase shifting by pi.

6. The method of claim 1, wherein
$W_{b2, S1a}$ equals or substantially equals $e^{i(\beta+\pi)}(W_{b1, T1b})^* \alpha_1$, and
$W_{b2, T1b}$ equals or substantially equals $e^{i\beta}(W_{b1, S1a})^* 1/\alpha_1$, wherein $\beta$ is a first value and $\alpha 1$ is a second value.

7. The method of claim 6, wherein $\alpha_1=1$ and $\beta=0$.

8. The method of claim 6, wherein $\alpha_1$ is a function the power of a signal emitted by the first antenna and the power of a signal emitted by the second antenna.

9. The method of claim 1, wherein
the first antenna (A1) has a first polarization,
the second antenna (A2) has a second polarization,
the first polarization is orthogonal or substantially orthogonal to the second polarization, and
the first antenna (A1) and the second antenna (A2) have the same or substantially the same power pattern.

10. The method of claim 1, wherein
the first antenna element (AE1-$a$) comprises a second antenna element port ($T_{1a}$) connected to a third antenna (A3) having a polarization and a power pattern;
the second antenna element (AE1-$b$) comprises a second antenna element port ($S_{1b}$) connected to a fourth antenna (A4) having a polarization and a power pattern, and
the step of using the antenna array to create said first beam and said second beam further comprises:
applying beam weights $W_{b1, T1a}$ and $W_{b2, T1a}$ to antenna element port $T_{1a}$; and
applying beam weights $W_{b1, S1b}$ and $W_{b2, S1b}$ to antenna element port $S_{1b}$, wherein
$W_{b2, S1b}$ is a function of the complex conjugate of $W_{b1, T1a}$, and $W_{b2, T1a}$ is a function of the complex conjugate of $W_{b1, S1b}$.

11. The method of claim 10, further comprising
determining $W_{b2, S1b}$; and
determining $W_{b2, T1a}$, wherein
the step of determining $W_{b2, S1b}$ comprises (a) phase shifting the complex conjugate of $W_{b1, T1a}$ or (b) multiplying the complex conjugate of $W_{b1, T1a}$ by an amplitude scaling factor, thereby producing an amplitude scaled complex conjugate of $W_{b1, T1a}$, and phase shifting the amplitude scaled complex conjugate of $W_{b1, T1a}$, and
the step of determining $W_{b2,T1a}$ comprises determining the complex conjugate of $W_{b1, S1b}$.

12. The method of claim 10, wherein
the polarization of the first antenna (A1) is orthogonal or substantially orthogonal to the polarization of the third antenna (A3),
the polarization of the fourth antenna (A4) is orthogonal or substantially orthogonal to the polarization of the second antenna (A2), and
the third antenna (A3) and the fourth antenna (A4) have the same or substantially the same power pattern.

13. The method of claim 1, wherein
the antenna array further comprises a third antenna element (AE2-$a$) and a fourth antenna element (AE2-$b$) that together form a second pair of antenna elements (AE2-$a$,AE2-$b$), wherein the third antenna element (AE2-$a$) comprises an antenna element port ($S_{2a}$) connected to a fifth antenna (A5) and the fourth antenna element (AE2-b) comprises an antenna element port ($T_{2b}$) connected to a sixth antenna (A6), and the step of using the antenna array to create said first beam and said second beam further comprises:

applying beam weights $W_{b1,\,S2a}$ and $W_{b2,\,S2a}$ to antenna element port $S_{2a}$; and applying beam weights $W_{b1,\,T2b}$ and $W_{b2,\,T2b}$ to antenna element port $T_{2b}$, wherein $W_{b2,\,S2a}$ is a function of the complex conjugate of $W_{b1,\,T2b}$ phase shifted by pi $+\beta$; and $W_{b2,\,T2b}$ is a function of the complex conjugate of $W_{b1,\,S2a}$ phase shifted by $\beta$.

14. The method of claim 13, wherein the antenna array is a 2-dimensional antenna array.

15. The method of claim 13, wherein the first antenna element and the second antenna element are located symmetrically with respect to a symmetry point for the antenna array, and the third antenna element and the fourth antenna element are located symmetrically with respect to the symmetry point.

16. The method of claim 1, wherein (a) the shape of the power beam pattern for the first beam and the shape of the power beam pattern for the second beam are the same or substantially the same in a plurality of directions of interest and (b) the first beam and the second beam have orthogonal or substantially orthogonal polarizations in the coverage area.

17. An antenna array apparatus, comprising:

a first antenna element comprising a first antenna (A1) and an antenna element port ($S_{1a}$) connected to the first antenna (A1);

a second antenna element comprising a second antenna (A2) and an antenna element port ($T_{1b}$) connected to the second antenna (A2);

a first beam forming circuit configured to apply beam weights $W_{b1,\,S1a}$ and $W_{b2,\,S1a}$ to port $S_{1a}$; and a second beam forming circuit configured to apply beam weights $W_{b1,\,T1b}$ and $W_{b2,\,T1b}$ to port $T_{1b}$, wherein $W_{b2,\,S1a}$ is a function of $W_{b1,\,T1b}$, and $W_{b2,\,T1b}$ is a function of $W_{b1,\,S1a}$.

18. The antenna array of claim 17, wherein $W_{b2,\,S1a}$ is a function of the complex conjugate of $W_{b1,\,T1b}$, and $W_{b2,\,T1b}$ is a function of the complex conjugate of $W_{b1,\,S1a}$.

19. The antenna array of claim 18, further comprising a weight determining unit configured to determine $W_{b2,\,S1a}$ and $W_{b2,\,T1b}$, wherein the weight determining unit is configured to determine $W_{b2,\,S1a}$ by obtaining the complex conjugate of $W_{b1,\,T1b}$ and (a) phase shifting the complex conjugate of $W_{b1,\,T1b}$ or (b) multiplying the complex conjugate of $W_{b1,\,T1b}$ by an amplitude scaling factor, thereby producing an amplitude scaled complex conjugate of $W_{b1,\,T1b}$, and phase shifting the amplitude scaled complex conjugate of $W_{b1,\,T1b}$, and the weight determining unit is configured to determine $W_{b2,\,T1b}$ by obtaining the complex conjugate of $W_{b1,\,S1a}$.

20. The antenna array of claim 19, wherein the weight determining unit is configured to determine $W_{b2,\,S1a}$ by phase shifting the obtained complex conjugate of $W_{b1,\,T1b}$, thereby producing a phase shifted complex conjugate of $W_{b1,\,T1b}$, and multiplying the phase shifted complex conjugate of $W_{b1,\,T1b}$ by the amplitude scaling factor.

21. The antenna array of claim 19, wherein the weight determining unit is configured to phase shift the complex conjugate of $W_{b1,\,T1b}$ by phase shifting the complex conjugate of $W_{b1,\,T1b}$ by pi.

22. The antenna array of claim 17, wherein $W_{b2,\,S1a}$ equals or substantially equals $e^{i(\beta+\pi)}(W_{b1,T1b})^* \alpha_1$, and $W_{b2,\,T1b}$ equals or substantially equals $e^{i\beta}(W_{b1,\,S1a})^* 1/\alpha_1$, wherein $\beta$ is a first value and $\alpha 1$ is a second value.

* * * * *

UNITED STATES PATENT AND TRADEMARK OFFICE
CERTIFICATE OF CORRECTION

PATENT NO. : 8,981,993 B2
APPLICATION NO. : 13/095426
DATED : March 17, 2015
INVENTOR(S) : Petersson et al.

It is certified that error appears in the above-identified patent and that said Letters Patent is hereby corrected as shown below:

IN THE SPECIFICATION

In Column 1, Line 51, delete "$W_{b1,T1b}$and" and insert -- $W_{b1,T1b}$ and --, therefor.

In Column 2, Line 24, delete "$W_{b1,T1a}$" and insert -- $W_{b2,T1a}$ --, therefor.

In Column 2, Line 65, delete "$c^{i\beta}(W_{b1,S2a})*\alpha 1/\alpha_3$." and insert -- $c^{i\beta}(W_{b1,S2a})*1/\alpha_3$. --, therefor.

In Column 6, Line 28, delete "$W_{b1,Sxb}$and" and insert -- $W_{b1,Sxb}$ and --, therefor.

In Column 6, Line 58, delete "$Sqrt(P(d)_{A2}/(P(d)_{A1})$." and insert -- $Sqrt(P(d)_{A2}/P(d)_{A1})$. --, therefor.

In Column 8, Line 53, delete "*$\alpha_x$" and insert -- *$\alpha_x$, --, therefor.

In Column 9, Line 10, delete "as." and insert -- as --, therefor.

In Column 10, Line 57, delete "(PPGAs)," and insert -- (FPGAs), --, therefor.

IN THE CLAIMS

In Column 11, Line 41, in Claim 1, delete "(AE1-b)that" and insert -- (AE1-b) that --, therefor.

In Column 11, Line 52, in Claim 1, delete "$W_{b1,T1b}$," and insert -- $W_{b1,T1b}$ --, therefor.

In Column 11, Line 64, in Claim 3, delete "$W_{b1,T1b}$," and insert -- $W_{b1,T1b}$ --, therefor.

In Column 12, Line 12, in Claim 6, delete "$\alpha 1$" and insert -- $\alpha_1$ --, therefor.

Signed and Sealed this
Fifteenth Day of December, 2015

Michelle K. Lee
*Director of the United States Patent and Trademark Office*

CERTIFICATE OF CORRECTION (continued)
U.S. Pat. No. 8,981,993 B2

IN THE CLAIMS

In Column 12, Line 26, in Claim 10, delete "(AE1-a)comprises" and insert
-- (AE1-a) comprises --, therefor.

In Column 12, Line 41, in Claim 11, delete "comprising" and insert -- comprising: --, therefor.

In Column 13, Line 37, in Claim 17, delete "$W_{b2,S1a}$" and insert -- $W_{b2,S1a}$ --, therefor.

In Column 14, Line 2, in Claim 17, delete "$T_{1b,\ wherein}$" and insert -- $T_{1b}$, wherein --, therefor.

In Column 14, Line 17, in Claim 19, delete "$W_{b1,T1b}$," and insert -- $W_{b1,T1b}$, --, therefor.